(12) United States Patent
Zibuschka et al.

(10) Patent No.: US 10,033,538 B2
(45) Date of Patent: Jul. 24, 2018

(54) METHOD FOR SAFEGUARDING A NETWORK

(71) Applicant: Robert Bosch GmbH, Stuttgart (DE)

(72) Inventors: Jan Zibuschka, Eichenzell (DE); Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 164 days.

(21) Appl. No.: 14/881,982

(22) Filed: Oct. 13, 2015

(65) Prior Publication Data
US 2016/0127357 A1    May 5, 2016

(30) Foreign Application Priority Data

Oct. 30, 2014 (DE) .......................... 10 2014 222 222

(51) Int. Cl.
*G06F 7/04* (2006.01)
*G06F 15/16* (2006.01)
(Continued)

(52) U.S. Cl.
CPC ............ *H04L 9/3278* (2013.01); *G06F 21/44* (2013.01); *H04L 9/0866* (2013.01); *H04L 9/3215* (2013.01); *H04L 63/0428* (2013.01); *H04L 63/06* (2013.01); *H04L 63/08* (2013.01); *H04L 63/18* (2013.01); *H04L 9/0861* (2013.01); *H04L 9/0863* (2013.01); *H04L 9/0875* (2013.01); *H04L 9/3271* (2013.01); *H04L 29/06* (2013.01); *H04L 63/0853* (2013.01)

(58) Field of Classification Search
CPC . H04L 9/3271; H04L 63/0853; H04L 9/0861; H04L 9/0863; H04L 9/0875; H04L 63/18; H04L 29/06; G06F 21/44; G06F 7/04; G06F 15/16; G06F 17/30
See application file for complete search history.

(56) References Cited

U.S. PATENT DOCUMENTS 6,031,913 A * 2/2000 Hassan ................. H04L 9/0838
380/44
8,375,207 B2 * 2/2013 Dangoor ............... H04L 63/062
380/270
(Continued)

FOREIGN PATENT DOCUMENTS

DE     10 2010 038 703     1/2012
DE     10 2010 041 447     3/2012

*Primary Examiner* — Jayesh M Jhaveri
(74) *Attorney, Agent, or Firm* — Norton Rose Fulbright US LLP; Gerard Messina

(57) ABSTRACT

A method for safeguarding a network made up of at least one first device and one second device. The first device derives a first challenge from physical properties of a first communication channel between the first device and the third device. In addition, the first device transmits the first challenge to the second device via a second communication channel between the first device and the second device. The first device receives a first response, corresponding to the first challenge, from the third device via the first communication channel and receives a second response, corresponding to the first challenge, from the second device via the second communication channel. The first device compares the first response and the second response to one another to verify that the second device is communicating with the third device.

13 Claims, 2 Drawing Sheets

(51) Int. Cl.
  *G06F 17/30*  (2006.01)
  *H04L 9/32*  (2006.01)
  *G06F 21/44*  (2013.01)
  *H04L 29/06*  (2006.01)
  *H04L 9/08*  (2006.01)

(56) References Cited

U.S. PATENT DOCUMENTS

| | | | |
|---|---|---|---|
| 9,306,930 B2* | 4/2016 | Keys | H04L 63/08 |
| 2007/0036353 A1* | 2/2007 | Reznik | H04B 7/0434 |
| | | | 380/30 |
| 2013/0163752 A1* | 6/2013 | Baek | H04L 63/065 |
| | | | 380/44 |
| 2015/0113275 A1* | 4/2015 | Kim | H04L 9/3273 |
| | | | 713/169 |

\* cited by examiner

METHOD FOR SAFEGUARDING A NETWORK

RELATED APPLICATION INFORMATION

The present application claims priority to and the benefit of German patent application no. 10 2014 222 222.2, which was filed in Germany on Oct. 30, 2014, the disclosure of which is incorporated herein by reference.

FIELD OF THE INVENTION

The present invention relates to information security, specifically, to the authenticity and confidentiality of a communication in a distributed system. In many scenarios in the so-called "Internet of Things," such as for home automation or for sensor networks, for example, small, resource-limited devices communicate with one another, and share potentially critical information via the devices and via persons in their surroundings. Such devices are also increasingly being connected to actuators, and allow control, frequently wirelessly, of critical functions, such as control of heating systems or power sources in home automation, for example, or even control of entire manufacturing operations in industrial automation.

It is therefore important to safeguard the authenticity of a communication (i.e., the property that the communication originates from a certain permissible device or takes place between certain permissible devices) and the confidentiality of a communication (i.e., the property that the communication cannot be intercepted by objectionable devices).

BACKGROUND INFORMATION

The use of physical unclonable functions (PUF) for authentication is known from DE 10 2010 038703 B3 and DE 10 2010 041447 A1, for example. Patent applications DE 10 2014 208975 A1 and DE 10 2014 209042 A1, not previously published, describe methods for secured communication in a distributed system on the basis of channel properties of the connected units. The latter methods belong to approaches, having the keyword "physical layer security," which are being investigated and developed, and with the aid of which in particular keys for symmetrical methods may be automatically generated based on physical properties of the transmission channels between the involved nodes. In the process, use is made of the reciprocity and the inherent randomness of these transmission channels.

SUMMARY OF THE INVENTION

A method for safeguarding a network is provided, in which a first user device of the network together with a further device ascertains a shared challenge from physical properties of the shared communication channel, and receives from same a response to this challenge, and in which the first user device additionally transmits the challenge to the further device via a second user device, and this second user device likewise receives the corresponding response of the further device. The two responses may be compared to one another, and the first device may thus verify that the two devices communicating with it are also communicating with one another. For this purpose, the same method may additionally be carried out subsequently or concurrently, also with interchanged roles of the further device and the second user device.

The responses may be determined by the devices in the described challenge-response methods by measuring physical properties of the devices after a prompt which is a function of the challenge. In particular physical unclonable functions may be utilized. The advantage of such challenge-response methods is the increased security and the lower level of administrative effort compared to methods in which the entire challenge-response information must be present in both devices.

Alternatively, pseudorandom functions for the challenge-response methods may be used, in particular when the method is additionally safeguarded by an encrypted data transmission. The use of pseudorandom functions allows a very particularly advantageous implementation of the provided challenge-response methods. The responses to the challenges may be computed either in the devices or on a database server itself. If the communication takes place with encryption, the algorithm used also does not necessarily have to be kept secret, since an attacker cannot then intercept the exchanged information. This would further simplify implementation.

To even further safeguard the network, the first device may also authenticate at least one of the two other devices via challenge-response methods.

In particular embodiments, the provided methods are used for devices which communicate with one another wirelessly. In such wireless systems it is particularly simple to derive suitable parameters from the wireless communication channel for creating a shared secret between the devices, as is necessary for ascertaining the challenge.

All communication channels used for the communication between the devices are advantageously cryptographically safeguarded using encryption algorithms. Since in this design, neither the challenges nor the responses of the challenge-response methods become public, challenge-response pairs may be used multiple times. Fewer of such value pairs thus need to be provided, which simplifies the organization of the method. The method is thus also speeded up. In one embodiment, the keys for the cryptographic safeguarding are ascertained via methods of physical layer security, in particular, thus from physical properties of the involved communication channels. Compared to conventional asymmetrical encryption methods, these methods offer greatly reduced demands on the required computing power, and compared to conventional symmetrical encryption methods, which generally involve complicated key management, provide a much simpler implementation. Using the physical layer security for deriving information for the challenge-response methods and also for safeguarding the communication by encryption also results in synergy effects for the involved hardware and software.

As a whole, the provided methods are very robust, since the challenge-response methods as well as the encryption may be implemented based on physical properties, and are not based (solely) on mathematical mechanisms. Mathematical mechanisms are based on mathematical structures (such as elliptical curves, for example), which have structural properties. The presence of such structural properties entails the risk that someday algorithms will be discovered which are able to "crack" (i.e., solve) these mathematical mechanisms in polynomial time. In contrast, physics-based mechanisms in practical implementation have no structural properties, since noise and nonlinearity greatly distort the theoretical behavior. Mathematical mechanisms could also become more susceptible to attack in the future due to the possible availability of significantly greater computing power (such as quantum computers).

The described methods are thus easy to implement, and are suitable even for devices having limited resources (such as limited computing power, limited memory, limited energy stores, for example).

In addition to the provided methods, the present invention further relates to computer programs which carry out these methods, and devices and systems on which the described methods run.

The present invention is described in greater detail below with reference to the appended drawings, and based on exemplary embodiments.

DETAILED DESCRIPTION

Figure 1:
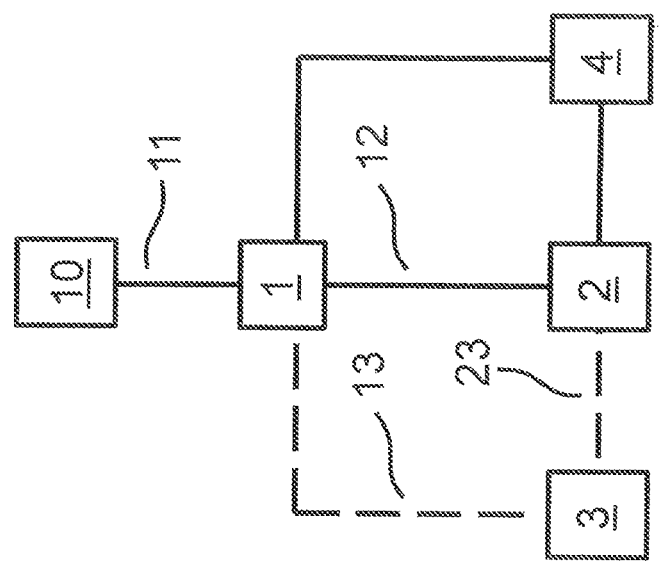
FIG. 1 shows an example of a network which includes multiple devices as users.

In order to ensure the security of a growing network which includes multiple users, it is important to monitor the connection of a new user to the network. For example, if a user to be newly accepted communicates in such a network with a user that is already present, the permissibility of this communication should be monitored, or the users should be verified or authenticated for this communication. This is particularly true when the network is an intermeshed network, in which the new connection of a network user does not necessarily have to take place via a central node.

For this purpose, methods are provided in which a user device on the network ensures that a second device is actually communicating with a certain third device which the second device believes it is communicating with, and not with a further device which, for example, is only feigning this identity. When this is ensured, the user device may then initiate, for example, the connection process between the second device and the third device. The overall process may be actively triggered by one of the devices (primarily by the user device), or simply due to the fact that the various devices are in sufficiently close proximity to one another.

Challenge-response methods may be used in which the response to a challenge is determined by measurements of physical properties due to a prompt specified by the challenge, in particular on the basis of physical unclonable functions.

Value pairs are determined in advance with the aid of measurements of physical properties of a system, each value pair corresponding to a prompt by the system and the corresponding response of the system. It is very difficult or even impossible, at least with an achievable level of effort, to reconstruct the underlying physical properties in a counterfeited system, so that these value pairs are used, in a manner of speaking, as a fingerprint of the system, and the underlying properties are often referred to as physical unclonable functions (PUF). The challenge-response pairs may be used for identification or authentication of the system. Furthermore, challenge-response mechanisms may also be used which are based on modeling of physical unclonable functions (PUF). For any inquiry (challenge), a model may generate a response which, although it is generally prone to error due to incomplete modeling, it may be generated with sufficient accuracy for the purpose of the authentication process.

For the methods, shared secrets such as keys or challenges may also be derived by two devices in each case from physical properties of the shared communication channel, and optionally negotiated. Based on physical properties of their shared transmission channel, the devices in each case ascertain values, in particular a bit sequence, upon which they base the ascertained secret in each case. Use is made of the reciprocity and the inherent randomness of the transmission channel between the involved devices. This may take place, for example, as described in greater detail below.

The two devices estimate a certain number of channel parameters, possibly also as a function of time. These channel parameters are suitably quantized by both devices. Measures for noise reduction or error reduction then may follow, for example by using error-correcting codes.

With the aid of suitable mechanisms, balancing of the quantized channel parameters between the devices then takes place, which may be by using a public protocol. This is often necessary, since due to measuring inaccuracies, noise, interferences, etc., the two devices generally have not initially ascertained identical parameter sets. The balancing should be configured in such a way that a potential attacker who may intercept the exchanged data is not able to easily deduce the quantized channel parameters. For this purpose, parity bits, for example, may be exchanged between the devices. A validation of the shared secret (an entropy estimation, for example) and an improvement of the shared parameter set or the shared bit sequence thus determined (for example, by compression via hash value formation) may also optionally be carried out. Lastly, both devices have a shared secret based on the channel parameters which are quantized, processed, and balanced in this way.

It is assumed that a potential attacker is at a sufficiently great distance from the two devices in which the shared secret is to be generated. The distance should be at least within an order of magnitude of the so-called coherence length, which in present wireless communication systems is in the range of a few centimeters. Thus, the attacker in each case sees transmission channels which are different (independent) for these two devices, and therefore is not able to easily reconstruct the same shared secret.

Phase shifts and dampings due to the transmission channel, for example, and variables derived therefrom are suitable as channel parameters. The received signal strength indicator (RSSI) represents, for example, a common indicator for the received field strength of cordless communication applications, and may be used for these purposes. For ascertaining the channel parameters, known pilot signal sequences may be transmitted between the devices on both sides, which simplifies the necessary channel estimations.

In the described methods, it is assumed that the transmission channels between the devices have sufficient fluctuations of their channel properties (in particular sufficient random characteristics) in order to be able to derive suitable channel parameters from same which are suitable as the basis for generating a shared secret in the users. These fluctuations may occur in particular in the time range as well as in the frequency range, and in multiple antenna systems may also occur in the spatial range. However, it is also assumed that the channel properties have a sufficiently high correlation over short time periods that data transmissions may take place in both directions, from which the particular devices may estimate channel properties which are sufficiently the same despite a time shift, in order to obtain channel parameters which are sufficiently similar, from which identical shared secrets may be obtained. The shared secret then may either be used directly as a challenge or key for an encryption, or may at least be based on these variables.

The described methods are suitable for safeguarding a network made up of at least two devices which communicate with one another, which may be via wireless communication links or channels. The devices may be linked to one another via point-to-point connections or in some other type of communication network.

One possible design of a communication network is shown in FIG. 1. Multiple devices (users 1, 2, and 4 in the exemplary embodiment shown) are linked to one another in a communication network. In addition, a third user 3 is shown which, as indicated in the drawing, is to be or would like to be connected to the network, for example via connections to user 1 and user 2. Devices 2, 3, and 4 are in particular small, resource-limited sensor or actuator nodes. These users 2 through 4 may be monitored or controlled, for example via user 1, likewise present in the network, which may be configured as a user terminal 1, for example. Such a user terminal 1 generally has significantly more resources (computing power, memory space, interfaces, energy), and may be implemented, for example, by a smart phone, a tablet computer, or similar devices. In addition, a database server 10 may also be provided, to which user terminal 1 is connected via the Internet 11, for example. Database server 10 may be provided in particular by the manufacturer of user terminal 1 or some other trustworthy entity, and may also be used, among other things, for online support of user terminal 1.

The methods are described below in order of priority, with reference to the three devices 1, 2, and 3 from FIG. 1, of which first device 1 would like to verify that second device 2 and third device 3 are actually communicating with one another, and that, for example, an unauthorized further device has not intruded into the communication. Such a scenario could be relevant, for example, when third device 3, as shown, initially would like to connect to an intermeshed network in which first device 1 and second device 2 are already present. The term "connect" may be intended to mean that third device 3 does not merely communicate with the network, but, rather, is registered in the network as a trustworthy communication user. First device 1 could take on the task of controlling or monitoring the safeguarded addition of third device 3 via a communication with second device 2. In addition, the addition could also be initiated by first device 1. If first device 1 is a user terminal, its participation in the addition of new users to the existing network gives explicit control to a user concerning which devices may be accepted into the network. However, in principle the methods are usable for verifying the communication partner of a second device via a first device.

Figure 2:
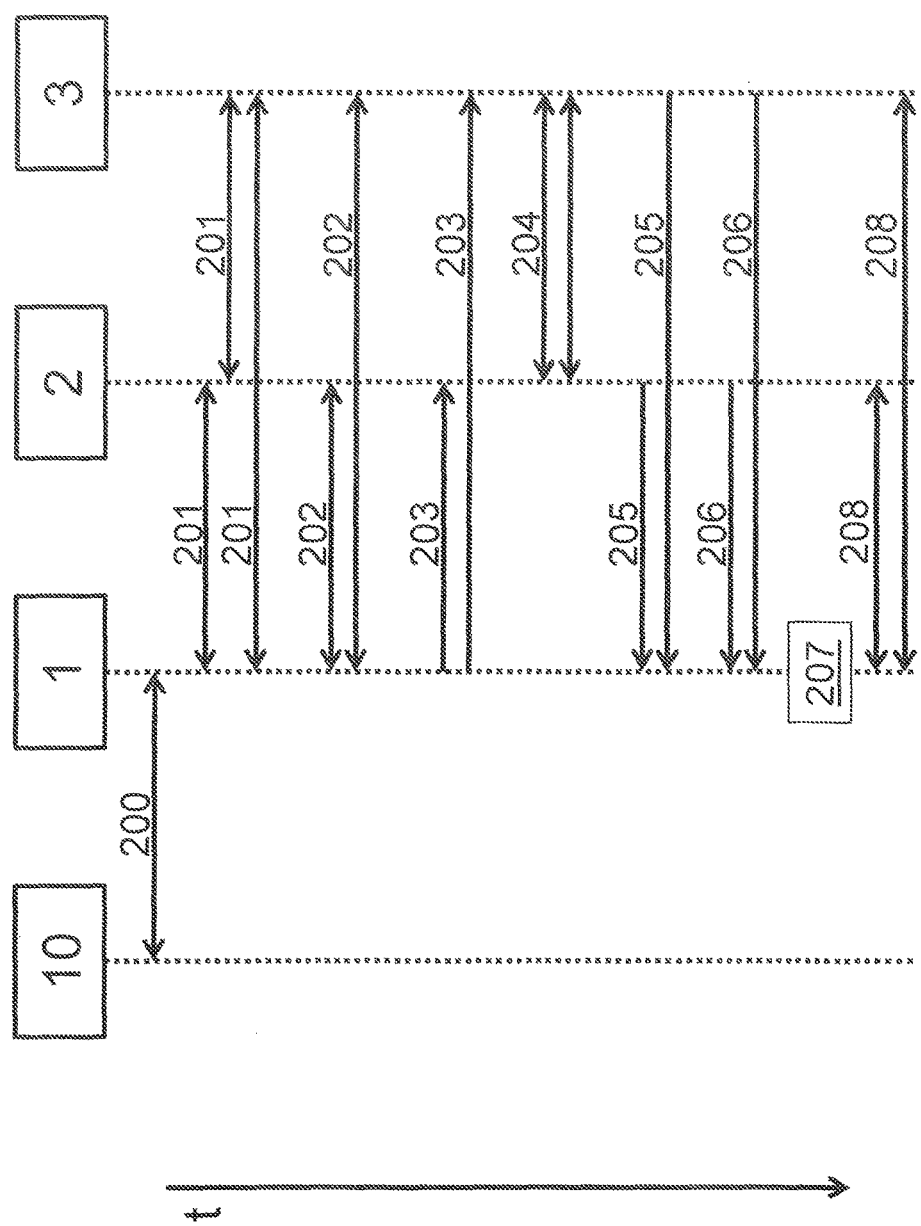
FIG. 2 schematically shows an example of a method for verifying communication partners in a network.

The present invention is described below for the scenario just outlined, with reference to FIG. 2.

First device 1 may query challenge-response pairs or a challenge-response function in an optional step 200 for an authentication of a database server 10 to which first device 1 is connected. This step is necessary if it is not only to be verified that a second device 2 is actually communicating with a third device 3, but in addition, second device 2 or third device 3 are also to be authenticated. Similarly, the queried challenge-response information must be suitable for their authentication.

All devices 1, 2, 3 establish confidential communication channels among one another in step 201. This means that device 1 establishes a confidential communication channel 12 with device 2 and a confidential communication channel 13 with device 3, and devices 2 and 3 likewise establish a confidential communication channel 23 with one another. For this purpose, the devices, which are linked in pairs, each must have suitable keys to be able to ensure their confidentiality via an encryption of the exchanged data. Such an encryption may take place, for example, via the above-described methods of so-called physical layer security. In the process, two devices in each case thus generate identical keys, which may be based on a confidential communication, from physical properties of the shared communication channel.

Challenges for challenge-response methods are ascertained in devices 1, 2, 3 in step 202. For this purpose, first device 1 together with second device 2 ascertains a first secret challenge from the physical properties of shared communication channel 12, and likewise ascertains, together with third device 3, a second challenge from the physical properties of shared communication channel 13. For this purpose, the above-described described methods of physical layer security may once again be used.

As a result of the challenges being ascertained from the physical properties of the communication channels, at this point in time they have not yet been transmitted via any communication channels, and thus cannot be intercepted by an attacker.

In step 203, first device 1 transmits the challenge which, the same as second device 2, it has derived from physical properties of shared transmission channel 12 with second device 2, to third device 3, and transmits the challenge which, the same as third device 3, it has derived from physical properties of transmission channel 13 with third device 3, to second device 2. This means that the challenges which have thus far been ascertained only in devices 1, 2, 3 are now also sent. For this purpose, the corresponding messages may be encrypted so that an attacker cannot intercept the challenges. The encryption takes place in each case with the shared, secret keys of devices 1, 2, 3 which have been negotiated in step 201.

In step 204, second device 2 relays the challenge, received from first device 1 in step 203, to third device 3, and third device 3 relays the challenge, received from first device 1 in step 203, to second device 2. The second device ascertains the response to the challenge received from third device 3 and sends it back to third device 3. Third device 3 ascertains the response to the challenge received from second device 2 and sends it back to second device 2. This exchange of challenges and responses takes place in each case directly via shared, confidential communication channel 23 between second device 2 and third device 3, and may take place in encrypted form.

The received challenges should now correspond to the challenges which are already present in the devices, which have already been derived in each case in step 202 from shared channel 12 and 13 with the first device. If this is the device with which second device 2 is communicating, but is not third device 3, with which first device 1 likewise has a connection and with which it has derived the challenge in step 202, but instead is a malicious further device, for example, these challenges will inevitably differ.

In step 205, second device 2 transmits the response, obtained from third device 3 in step 204, to first device 1, and third device 3 transmits the response, obtained from second device 2 in step 204, to first device 1. The transmission once again takes place in encrypted form to first device 1 via the particular direct communication channels 12 and 13.

In step 206, second device 2 and third device 3 now transmit to first device 1 the internally derived responses to the challenges derived in step 202, together with first device 1, from physical properties of the transmission channel. The responses are once again transmitted in encrypted form to first device 1 via direct, confidential communication channels 12 and 13.

If it is assumed, as described for step 204, that the challenges derived in step 202 are the same as those received in step 204, the same (or for uncertainty-afflicted challenge-response methods, largely the same) response is likewise ascertained. There is a different situation when the two devices 2 and 3 with which first device 1 is communicating are not the two devices which also want to communicate with one another, but, rather, some other, malicious device has intruded into the communication.

In step 207, first device 1 now compares the response, obtained from second device 2 in step 206, to the response obtained from third device 3 in step 205, and compares the response, obtained from third device 3 in step 206, to the response obtained from second device 2 in step 205.

In the same way as explained for steps 204 and 206, the comparison shows that the compared responses (sufficiently) match one another if the two devices 2 and 3 with which first device 1 communicates in each case via a confidential channel 12 and 13 are also the two devices which are communicating with one another. It may then be assumed that these two devices likewise share a secure, confidential channel. If one of the comparisons results in nonidentical responses, it must be suspected that some other, possibly malicious, device would like to connect to the network. In this case, first device 1 could either send an appropriate warning message to one of the devices (for example, to second device 2 for the case described above that third device 3 is to be newly connected to the network), or first device 1 could no longer support, or even actively prevent, a further connection of one of the devices. This applies in particular when first device 1, as described, occupies a special position in the network, for example as a user terminal which exercises control over the network.

Up to this step, first device 1 has checked or ensured that the two devices 2 and 3, with which it maintains safeguarded communication channels 12 and 13, are also carrying out (safeguarded) communication with one another. In order to still ensure now that one of the devices (in particular for a device 3 to be newly connected to the network) is a certain (in particular a permitted) device, i.e., in order to authenticate same, optional step 208 is provided which may be linked to optional step 200. Second device 2 and/or third device 3 may be authenticated with challenge-response pairs or challenge-response functions which are present in first device 1. For this purpose, either the responses already obtained by first device 1 in steps 205 and 206 may be used, or new challenge-response loops may be completed with the devices to be authenticated. In the latter case, device 1 sends a challenge to device 2 or device 3 to be authenticated, and authenticates it when the response is correct. Challenge-response methods may be once again resorted to for the authentication, using physical unclonable functions (PUF).

If the comparison in step 207 is positive, and the optionally provided authentication is also successful, first device 1 may support or initialize the further connection of a device to be connected, or in general may enable the further communication between second device 2 and third device 3.

After step 201, second device 2 and third device 3 have a shared key which they may utilize for various cryptographic objectives such as confidentiality, message authentication, integrity assurance, and so forth, during their further communication. In addition, second device 2 and third device 3 may in turn authenticate first device 1 as permissible. Moreover, it is particularly advantageous when second device 2 and third device 3 exchange challenge-response information with one another after successful enablement by first device 1. With this challenge-response information, they may authenticate in the future, and are not dependent on support by first device 1, for example after a subsequent separation followed by reconnection.

The described sequence of the steps corresponds to one embodiment of the method. However, proceeding in this sequence is not mandatory. For example, step 206 could also already take place directly after step 202, or also after step 203.

In the described embodiment, first device 1 checks that third device 3, which is known to first device 1, is communicating with second device 2, and also that second device 2, which is known to first device 1, is communicating with third device 3. In alternative embodiments, it is also possible for only one of these objectives to be covered, for example only the first objective, in that first device 1 negotiates a challenge only with third device 3 in step 202, sends only this challenge to second device 2 in step 203, only second device 2 sends the challenge to third device 3 and receives the appropriate response back from it in step 204, and second device 2 sends the response to first device 1 in step 205. In step 207, first device 1 may then compare this response to the response it has received from third device 3 in step 206.

Instead of the described PUF authentication methods, pseudorandom functions (PRF) may also be used for the various challenge-response methods, in particular for encrypting the appropriate communications. Since the challenge as well as the response are then transmitted via confidential channels from which an attacker is not able to obtain any information, pseudorandom functions may be sufficiently secure. Encrypted hash functions or message authentication codes (HMAC, for example) are suitable as pseudorandom functions. In this case, the device issuing the challenge does not require the presence of challenge-response pairs for verifying the correct response to a challenge, and instead may compute these itself with the aid of the pseudorandom functions.

The provided authentication methods may be used, for example, in wirelessly communicating miniature sensors and in sensor networks in home automation.

What is claimed is:

1. A method for safeguarding a network having at least one first device and one second device, the method comprising:
    performing by the first device:
        deriving a first challenge from physical properties of a first communication channel between the first device and a third device;
        transmitting the first challenge to the second device over a second communication channel between the first device and the second device;
        receiving a first response to the first challenge from the third device over the first communication channel;
        receiving a second response to the first challenge from the second device over the second communication channel; and
        comparing the first response and the second response to one another to verify that the second device is communicating with the third device,
        wherein the second response is a response which is transmitted from the third device to the second device as a reaction to a transmission of the first challenge to the third device by the second device.

2. The method of claim 1, wherein the communication via the first communication channel and the second communication channel is safeguarded in each case via data encryption.

3. The method of claim 1, wherein the transmission of the first challenge from the second device to the third device, and the transmission of the second response from the third device to the second device, occurs via a third communication channel between the second device and the third device, and the communication via the third communication channel is safeguarded via data encryption.

4. The method of claim 2, wherein at least one key for at least one data encryption of a communication channel between two devices is derived by the two devices from physical properties of the communication channel.

5. The method of claim 1, wherein the third device determines the first and the second responses to the first challenge by measuring physical properties of the third device after a prompt which is a function of the first challenge.

6. The method of claim 5, wherein the first and the second responses to the first challenge take place via a challenge-response method based on a physical unclonable function.

7. The method of claim 1, wherein the first response and the second response to the first challenge are ascertained by the third device corresponding to a challenge-response method based on pseudorandom functions.

8. The method of claim 1, wherein the first device authenticates at least one of the second device and the third device via challenge-response information stored in the first device.

9. The method of claim 1, wherein the devices communicate with one another wirelessly.

10. The method of claim 1, wherein the first device derives a second challenge from physical properties of the second communication channel between the first device and the second device, the first device transmits the second challenge to the third device via the first communication channel between the first device and the third device, the first device receives a third response, corresponding to the second challenge, from the second device via the second communication channel and receives a fourth response, corresponding to the second challenge, from the third device via the first communication channel, and the first device compares the third response and the fourth response to one another to verify that the third device is communicating with the second device.

11. A non-transitory computer readable medium having a computer program, which is executable by a processor to perform a method for safeguarding a network having at least one first device and one second device, the method comprising:
performing by the first device:
deriving a first challenge from physical properties of a first communication channel between the first device and a third device;
transmitting the first challenge to the second device over a second communication channel between the first device and the second device;
receiving a first response to the first challenge from the third device over the first communication channel;
receiving a second response to the first challenge from the second device over the second communication channel; and
comparing the first response and the second response to one another to verify that the second device is communicating with the third device,
wherein the second response is a response which is transmitted from the third device to the second device as a reaction to a transmission of the first challenge to the third device by the second device.

12. The non-transitory computer readable medium of claim 11, wherein the communication via the first communication channel and the second communication channel is safeguarded in each case via data encryption.

13. A device, comprising:
a wireless communication transceiver; and
a non-transitory computer readable medium having a computer program, which is executable by a processor to perform a method for safeguarding a network having at least one first device and one second device, the method including:
performing by the first device:
deriving a first challenge from physical properties of a first communication channel between the first device and a third device;
transmitting the first challenge to the second device over a second communication channel between the first device and the second device;
receiving a first response to the first challenge from the third device over the first communication channel;
receiving a second response to the first challenge from the second device over the second communication channel; and
comparing the first response and the second response to one another to verify that the second device is communicating with the third device,
wherein the second response is a response which is transmitted from the third device to the second device as a reaction to a transmission of the first challenge to the third device by the second device.

* * * * *